US008746791B2

(12) United States Patent
Segato

(10) Patent No.: US 8,746,791 B2
(45) Date of Patent: Jun. 10, 2014

(54) SHAPE-MEMORY SADDLE STRUCTURE, PARTICULARLY FOR PEDAL DRIVEN VEHICLES, AND PROCESS FOR MAKING SUCH STRUCTURE

(75) Inventor: Stefano Segato, Vicenza (IT)

(73) Assignee: Selle Royal S.p.A., Pozzoleone (Vicenza) (IT)

(*) Notice: Subject to any disclaimer, the term of this patent is extended or adjusted under 35 U.S.C. 154(b) by 1525 days.

(21) Appl. No.: 11/577,754

(22) PCT Filed: Oct. 24, 2005

(86) PCT No.: PCT/IB2005/003175
§ 371 (c)(1),
(2), (4) Date: Apr. 23, 2007

(87) PCT Pub. No.: WO2006/046110
PCT Pub. Date: May 4, 2006

(65) Prior Publication Data
US 2009/0102251 A1 Apr. 23, 2009

(30) Foreign Application Priority Data
Oct. 26, 2004 (IT) .............................. VI2004A0254

(51) Int. Cl.
B62J 1/18 (2006.01)
(52) U.S. Cl.
USPC ........................................................ 297/214

(58) Field of Classification Search
USPC ......................................................... 297/214
See application file for complete search history.

(56) References Cited

U.S. PATENT DOCUMENTS

| 5,286,082 | A | 2/1994 | Hanson |
| 5,340,192 | A | 8/1994 | Hsh |
| 5,670,232 | A * | 9/1997 | Bigolin ......................... 297/200 |
| 7,572,498 | B2 * | 8/2009 | Bigolin ......................... 297/214 |
| 2003/0164629 | A1 * | 9/2003 | Bigolin ...................... 297/214 X |
| 2004/0090096 | A1 | 5/2004 | Bigolin |
| 2006/0022496 | A1 | 2/2006 | Fregonese |
| 2006/0049675 | A1 | 3/2006 | Fregonese |

* cited by examiner

Primary Examiner — Anthony D Barfield
(74) Attorney, Agent, or Firm — Tutunjian & Bitetto, P.C.

(57) ABSTRACT

A shape-memory saddle structure, particularly for pedal driven vehicles, comprising a substantially rigid or semirigid support frame (2), means (4) for connecting said frame (2) to a vehicle, a yielding pad (7) secured to the upper face (S) of the frame (2), and a cover layer (5) laid over the yielding pad (3). The frame (2) has one or more portions (6, 6', 6") having a different deformability from that of the rest of the frame (2). The portions (6, 6', 6") include at least one membrane of fibrous material, which is susceptible to permanent deformation in response to a compression stress by a user, so as to take a deformed configuration. The membrane (7) is closely joined to at least one layer of elastomeric material (8), which is adapted to locally change the rigidity of the membrane (7) by elastically holding it at least partly in the deformed configuration, to customize the frame (2) to the specific user's body.

23 Claims, 3 Drawing Sheets

SHAPE-MEMORY SADDLE STRUCTURE, PARTICULARLY FOR PEDAL DRIVEN VEHICLES, AND PROCESS FOR MAKING SUCH STRUCTURE

FIELD OF THE INVENTION

This invention generally finds application in the art of pedal driven vehicles, and particularly relates to a shape-memory saddle structure.

The invention further relates to a process for making such a structure.

STATE OF THE ART

Saddles for vehicle driven vehicles, such as bicycles, tricycles or the like, are known to include a rigid support frame adapted to support a user's body weight and to allow is the saddle to be secured to the vehicle frame.

Compression at the contact points between the seat surface and the user is typically reduced by using elastic and/or shock absorbing elements, generally made of a polymeric foam or a material having a viscous behavior, interposed between the seat surface and the rigid structure.

During the pedaling process, the inside thigh areas of the user repeatedly contact the side periphery of the saddle, and are continuously rubbed thereagainst, which causes local skin-rashes and grazes.

U.S. Pat. No. 5,286,082 discloses a saddle which is able to pivot, by appropriate means, about the bicycle seat post, to accommodate movements of the rider's body. While this arrangement increases comfort for the user, it still has certain well-known drawbacks.

The pivoting motion of the saddle may cause early wear of the mechanical parts for connection to the seat post, and may lead them to fail with time. Furthermore, even though the outer portion of the saddle pivots, it is still in contact with the inside thigh areas of the rider, and still causes continuous rubbing of relevant surfaces, and consequent localized irritations. Also, these types of saddles have a very complex construction and require high manufacturing costs.

A saddle is further known from U.S. Pat. No. 5,340,192, which has a support structure with a cavity for receiving a highly resilient elastic member therein. This structure also has certain known drawbacks.

First, the elastic member is placed outside the saddle structure, which increases complexity during both fixation and operation thereof. If the member is not properly secured to the base body, it can be displaced by the motion of the pedaling legs, thereby forcing the user to stop repeatedly to adjust its operating position.

Furthermore, the provision of an interposed secondary member adversely affects the appearance of the saddle and makes it aesthetically unpleasing. Finally, the use of an outside member requires the provision of a support frame, which will have to be more rigid and uncomfortable, especially at the inside thigh areas.

In an attempt to overcome these drawbacks, a number of solutions have been developed, providing the use of supports having a different rigidity at the seating areas.

A saddle structure as described above is known from application WO04/031025 by the Applicant hereof, which represents the basis of the preamble of claim 1. The differential rigidity of the support frame is obtained by using a plurality of elongate extensions, outwardly projecting from respective peripheral recesses. These extensions are also interconnected by a member made of a plastic or elastomeric material.

While this solution allows to locally change the frame rigidity, it still has certain known drawbacks.

The material that forms the extensions is relatively rigid and poorly yielding under compression stresses. Furthermore, the base material of the frame is elastically yielding by its nature and cannot permanently fit the user's anatomy. In other words, the frame cannot be user-customized to optimize comfort during use.

SUMMARY OF THE INVENTION

The object of this invention is to overcome the above drawbacks, by providing a saddle structure that achieves high efficiency and has a relatively simple construction.

A particular object is to provide a saddle structure that can fit the pelvic conformation of any user.

A further object of the invention is to provide a shape-memory saddle structure, that can maintain the structural conformation taken under user induced compression stress.

Another object of the invention is to provide a saddle structure that can increase user comfort, especially at the inside thigh areas.

Yet another object is to provide a cost-effective and easily-reproducible process for making a saddle structure.

These objects, as well as other objects that will be more apparent hereafter, are achieved by providing a saddle structure according to claim 1, which comprises a substantially rigid or semirigid support frame, a yielding pad secured to the upper face of said frame, a cover layer laid over said yielding pad, said frame having one or more portions with a different deformability from that of the rest of the frame, characterized in that said differently deformable portions include at least one membrane of fibrous material having a predetermined starting configuration, said fibrous material being susceptible to elastic deformation in response to a compression stress by a user, so as to take a final deformed configuration, said membrane being closely joined to at least one layer of elastomeric material, which is adapted to locally change the rigidity of the membrane by elastically holding it at least partly in the deformed configuration.

Thanks to this particular arrangement, the saddle structure of the invention is able to fit any user's body. The ability to permanently maintain a structural conformation that is optimized for user comfort, allows the structure to be customized to the specific needs of each user.

In a further aspect of the invention, a process is provided for making a shape-memory saddle structure, characterized in that it includes the steps of setting up a mold having an internal cavity of a predetermined shape, opening said mold and depositing at least one layer of thermoplastic material therein, setting up a membrane which is susceptible to permanent deformation in response to an external compression stress to take a deformed configuration, impregnating said membrane with a thermosetting resin, laying said at least one membrane on said at least one layer of thermoplastic material, to define one or more portions having a different deformability from that of the rest of the frame, closing said mold and heating it to a predetermined temperature, cooling said mold to ambient temperature, opening said mold and removing the finished frame, securing a yielding pad to the upper surface of said frame, and laying one cover layer on said pad.

BRIEF DESCRIPTION OF THE DRAWINGS

Further features and advantages of the invention will be more apparent from the detailed description of a preferred, non-exclusive embodiment of a saddle structure according to the invention, which is described as a non-limiting example with the help of the annexed drawings, in which.

DETAILED DESCRIPTION OF A PREFERRED EMBODIMENT

Figure 1:
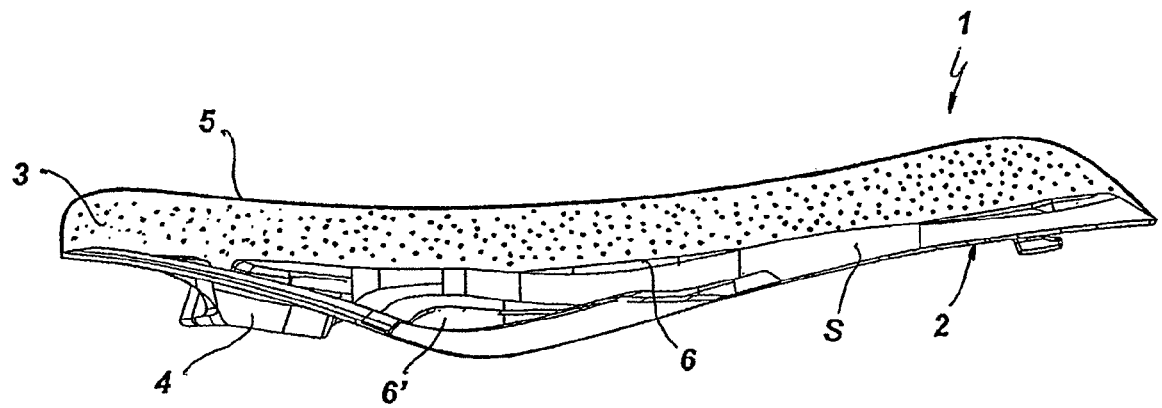
FIG. 1 is a partly broken away perspective view of a saddle structure according to the invention.
Figure 2:
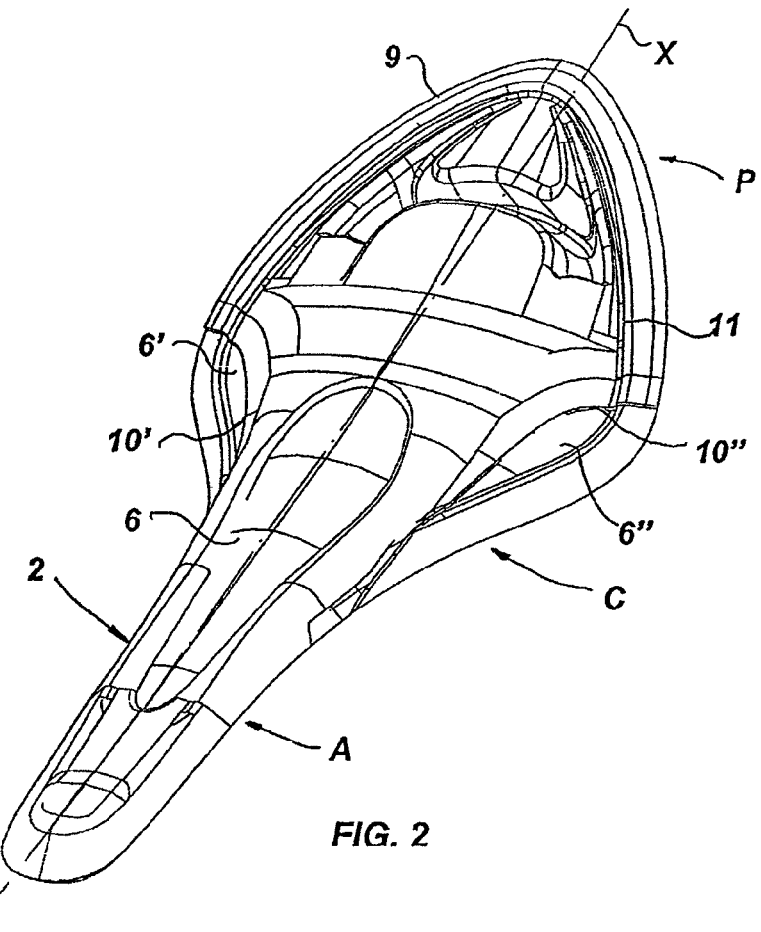
FIG. 2 is an axonometric view of a detail of FIG. 1.
Figure 3:
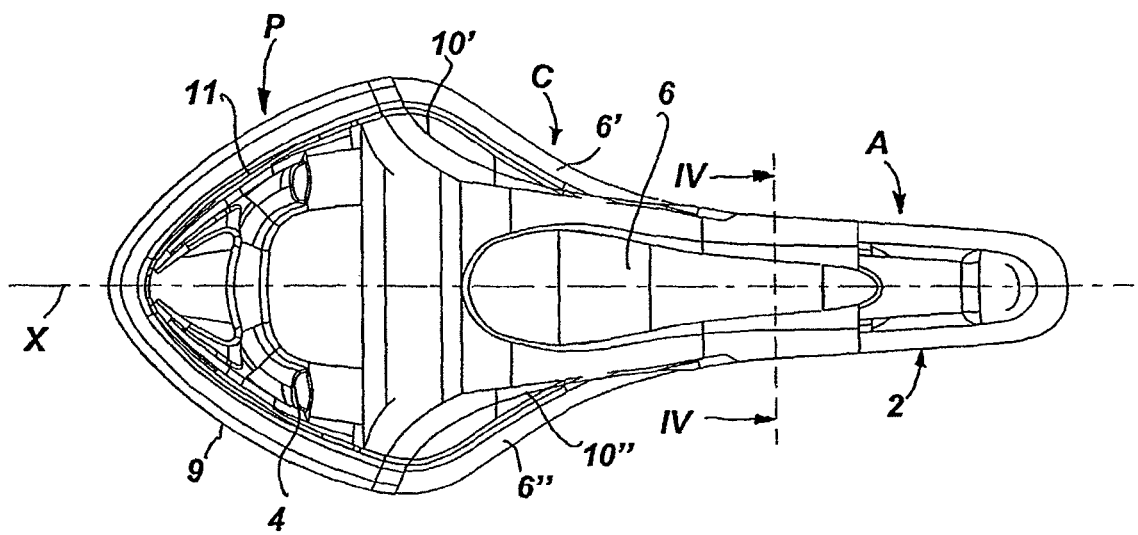
FIG. 3 is a bottom view of a detail of FIG. 1.
Figure 4:
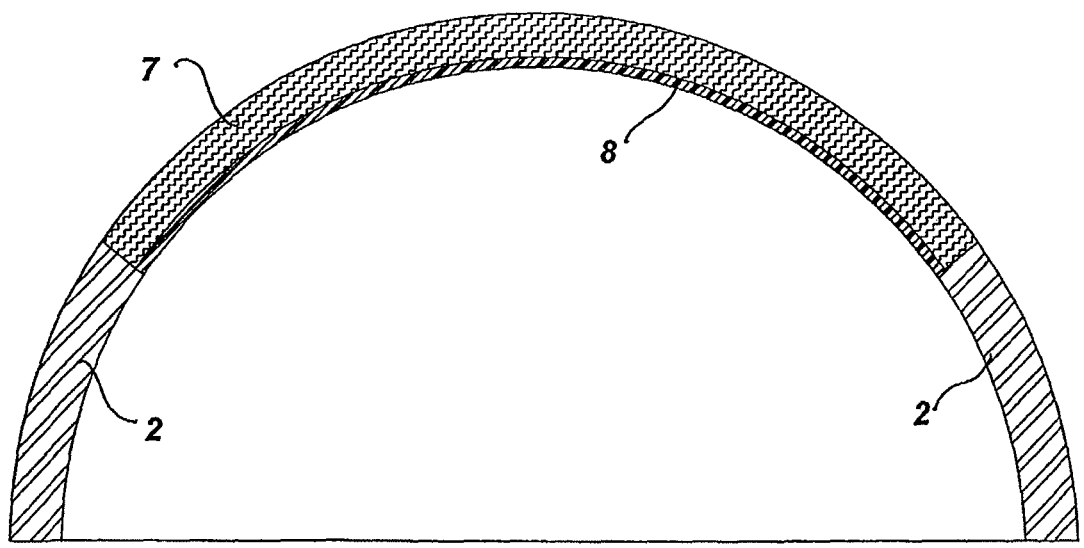
FIG. 4 shows a detail of FIG. 3, as taken in a partly broken away view, along a plane IV-IV.
Figure 5:
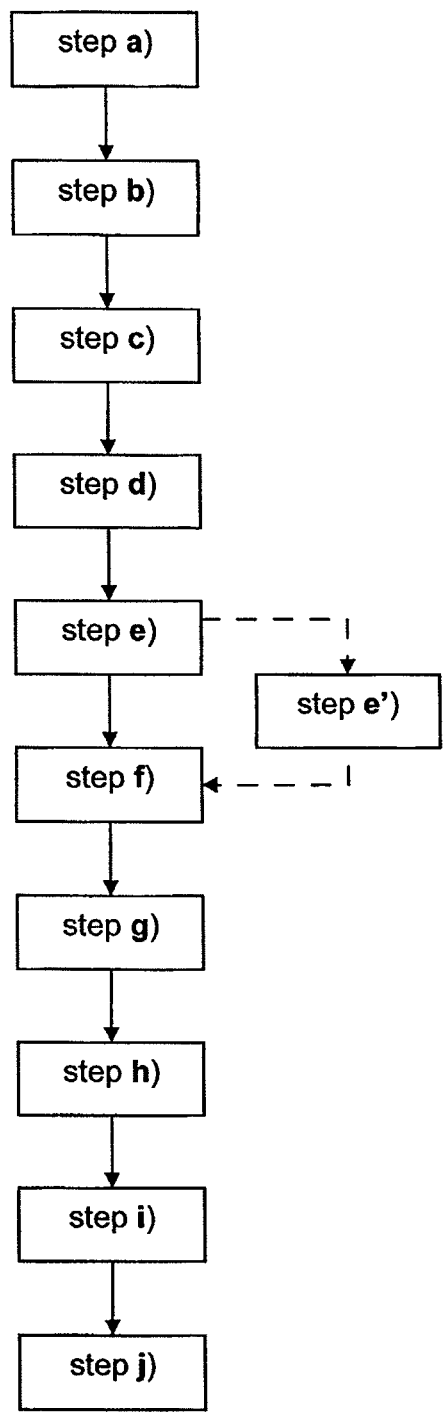
FIG. 5 shows a flowchart of the process for making the saddle structure of the invention.

Referring to the above figures, the saddle structure of the invention, generally denoted by numeral 1, basically comprises a substantially rigid or semirigid support frame 2 and a yielding pad 3, for instance made of foam, secured to the upper face S of the frame 2.

In a known manner, the structure has means 4 for connecting the frame 2 to a pedal driven vehicle, such as a bicycle, a tricycle or a tandem. For instance, these means 4 may consist of a housing having a cavity for a fork which connects the saddle to the seat post of a bicycle frame.

A cover layer 5, which may be made of a soft synthetic material, such as Lycra®, imitation leather or the like, is laid over the pad 3.

According to the invention, the frame 2 may have one or more differential deformability portions 6, 6', 6", which have a peculiar response to a compression stress.

To this end, the portions 6, 6', 6" may consist of one fibrous membrane 7, which is selected of a type susceptible to deformation in response to a compression stress by a user, in such a manner as to change from a starting idle configuration to a final deformed configuration.

The base material of the membrane 7 will preferably be synthetic, and more preferably selected from carbon, Kevlar®), glass fiber or the like.

Conveniently, the membrane 7 may be incorporated in and closely joined to at least one layer 8 of an elastomeric material, which is adapted to permanently and locally change the rigidity of the membrane 7—layer 8 assembly by a structural change of the connection between the two materials, aimed at forming an integral shape-memory membrane.

Thus, the configuration of the frame 2 may be customized, i.e. adapted to the body of any user.

In practice, the portions 6, 6', 6" will be made of a composite polymeric material, which provides a shape-memory structure in controlled conditions.

More in detail, the polymer layers 8 may be joined to a predetermined number of fibrous membranes 7, so that the rigidity of the frame 2 may be progressively and not is abruptly changed at the differential elasticity portions 6, 6', 6". A substantially uniform and continuous structure is thus obtained, which can effectively support the user, while effectively reducing the stresses in the sensitive regions of the user's body, and improving comfort of use.

Advantageously, each fibrous membrane 7 may be joined to at least one layer of elastomeric material 8 by a resin, preferably a thermosetting epoxy resin.

To this purpose, the layer 8 may be a thermoplastic layer, preferably having a softening point close to or above the glass transition temperature of the thermosetting resin.

The operation of integral membranes in differential elasticity shape-memory portions 6, 6', 6" may be summarized as follows: Under external loads, the fibers that form the membrane 7 generate "microfractures" which permanently change the elastic structure, and take a configuration corresponding to the user's anatomy, while keeping the typical elastic features of the polymer unchanged.

The polymer layers 8 have two functions. In addition to imparting compliance to the assembly, they help to locally change the rigidity of the membrane 7—layer 8 assembly, by virtue of the microfractures at the interface between these two components, and within the assembly between the epoxy resin and the fibers of the membrane 7. This adds shape-memory properties to the structure, so that the latter may fit the muscle conformation of any user.

The construction of the frame 2 may include a laterally widened rear portion P for supporting the buttocks of a user and an elongate front portion A that defines a longitudinal axis L.

The portions 6, 6', 6" will be located in appropriate positions, coinciding with the parts of the user's body mostly exposed to grazes and rubbing during the pedaling motion.

Advantageously, at least one pair 6' and 6" of these portions is located at the widened rear portion O and/or at the connection C between the elongate front portion A and the widened rear portion P.

Conveniently, the pair of portions 6' and 6" may be located at an outer peripheral edge 9 of the frame 2, symmetrically to the axis X, so as to form frame "wings".

These wings will preserve the muscles of the inside thigh areas of the user, which will be in contact with portions specifically formed to accommodate the movements and be readily deformed during use.

For the deformation to be maintained, the materials and the conformation of the support structure are both important. To this end, the frame 2 may have at least one recess 10', 10" along the edge 9. Also, the frame 2 may have at least one stepped profile 11 formed all along the same edge 9.

Thanks to this particular arrangement, the compression stress will not be concentrated in one point but can be transferred along the stepped profile 11, and will be transformed into a pulling stress exerted all over the structure, and progressively on the portions 6', 6".

Advantageously, at least one of the differently deformable portions 6 may be located at the elongate front portion A and/or at the connection C between the elongate front portion A and the widened rear portion P.

The portion 6 may conveniently have an elongate shape, with an axis of symmetry coinciding with the longitudinal axis X.

By this arrangement, the sensitive areas of the user's pelvis may be protected, and any local pain is thus prevented.

A process for making the saddle structure as described above includes the following steps.

In a first step a), a mold is set up, which has an internal cavity of a predetermined shape. In step b), the mold is opened and one or more layers 8 of a thermoplastic material are deposited therein.

A step c) follows, in which one or more membranes 7 are set up, which are susceptible to deformation in response to an external compression stress to take a deformed configuration. Each membrane is then subjected to a step d) of impregnation with a thermosetting resin.

Then, a step e) is carried out, in which one or more previously processed membranes 7 are laid over each layer of thermoplastic material 8, to define one or more portions 6, 6', 6" having a different deformability from that of the rest of the frame 2.

In the next step f), the mold is closed and heated to a predetermined temperature, preferably close to the glass transition temperature of the thermosetting resin. This temperature may be of 60° C. to 180° C., and preferably of about 130° C.

After the step g) in which the mold is cooled to a final predetermined temperature; in step h), the mold is opened and the finished frame 2 is removed therefrom.

The next steps are step i) in which a yielding pad 3 is secured to the upper surface S of the frame and step j) in which a cover layer 5 is laid thereon, to obtain the finished saddle.

Advantageously, step e) may be followed by a step e') in which the fibers of the layer (8) and/or the membrane (7) are cut to break their continuity and facilitate the deformation of the membrane under stress.

From the above disclosure, the structure of the invention proves to fulfill the proposed objects and particularly meets the requirement of always fitting to the pelvic conformation of the user during operation.

The use of a composite material obtained by joining together a suitable number of layers 7 and 8, allows to form differently deformable portions of the frame 2, which are able to "memorize" such deformation in time.

The structure of the invention is susceptible of a number of changes and variants, within the inventive concept disclosed in the appended claims. All the details thereof may be replaced by other technically equivalent parts, and the materials may vary depending on different needs, without departure from the scope of the invention.

While the structure has been described with particular reference to the accompanying figures, the numerals referred to in the disclosure and claims are only used for the sake of a better intelligibility of the invention and shall not be intended to limit the claimed scope in any manner.

The invention claimed is:

1. A shape-memory saddle, comprising:
    a support frame having an upper face, and one or more deformable portions defining areas of the support frame configured to be more susceptible to deformation than the rest of the support frame, said deformable portions comprising
    at least one membrane of fibrous material; and
    at least one layer of elastomeric material joined to the membrane, wherein said membrane has a predetermined starting configuration, said fibrous material of the membrane being deformable in response to a user-exerted force to take a final deformed configuration, and said elastomeric material is adapted to elastically hold said membrane in said deformed configuration to provide shape-memory properties.

2. Structure as claimed in claim 1, wherein said at least one membrane of fibrous material is joined to said at least one layer of elastomeric material by a layer of resin.

3. Structure as claimed in claim 2, wherein said resin is an epoxy resin.

4. Structure as claimed in claim 2, wherein said resin is a thermosetting resin.

5. Structure as claimed in claim 4, wherein said at least one layer of elastomeric material comprises a thermoplastic material.

6. Structure as claimed in claim 5, wherein the softening point of said thermoplastic material is close to or above the curing temperature of said thermosetting resin.

7. Structure as claimed in claim 5, wherein said thermoplastic material is PVC.

8. Structure as claimed in claim 1, wherein the fibrous material of said at least one membrane is a synthetic or natural material.

9. Structure as claimed in claim 1, wherein said synthetic or natural material comprises carbon or glass fiber.

10. Structure as claimed in claim 1, wherein said frame has a laterally enlarged rear portion for supporting the buttocks of a user and an elongate front portion defining a longitudinal axis.

11. Structure as claimed in claim 10, wherein at least one pair of differently deformable portions is located in the proximity of said widened rear portion.

12. Structure as claimed in claim 10, wherein said at least one pair of differently deformable portions is provided at an outer peripheral edge of said frame, symmetrically with respect to said longitudinal axis.

13. Structure as claimed in claim 12, wherein said frame comprises at least one recess along said outer peripheral edge.

14. Structure as claimed in claim 10, wherein said frame comprises at least one stepped profile along said outer peripheral edge.

15. Structure as claimed in claim 10, wherein at least one of said differentially deformable portions is located in said elongate front portion.

16. Structure as claimed in claim 15, wherein said at least one differently deformable portion has an elongate shape along said longitudinal axis.

17. Structure as claimed in claim 10, wherein at least one pair of differently deformable portions is located in the proximity of a junction between said elongate front portion and said rear widened portion.

18. Structure as claimed in claim 10, wherein at least one of said differentially deformable portions is located at a junction between said elongate front portion and said rear widened portion.

19. A process for making a shape-memory saddle structure including a support frame comprising the steps of:
    a) setting up a mold having one internal cavity of a predetermined shape;
    b) depositing at least one layer of thermoplastic material in said mold;
    c) setting up at least one elastically deformable membrane;
    d) impregnating said elastically deformable membrane with a thermosetting resin;
    e) laying said at least one elastically deformable membrane on said at least one layer of thermoplastic material, to define one or more deformable portions having shape-memory properties and defining areas of the support frame configured to be more susceptible to deformation than the rest of the support frame;
    f) closing said mold and heating it to a predetermined temperature;
    g) cooling said mold to a predetermined final temperature;
    h) opening said mold and removing therefrom the support frame having an upper surface;
    i) securing a yielding pad to the upper surface of said frame; and
    j) laying a cover layer on said pad.

20. Process as claimed in claim 19, further comprising a step e') of cutting the fibers of one or both of the layer of thermoplastic material and the elastically deformable membrane to break their continuity.

21. Process as claimed claim 19, wherein said predetermined temperature is close to the glass transition temperature of said thermosetting resin.

22. Process as claimed in claim 21, wherein said predetermined temperature is 60° C. to 180° C.

23. Process as claimed in claim 21, wherein said predetermined temperature is about 130° C.

\* \* \* \* \*